US010781907B2

(12) United States Patent
Cariccia et al.

(10) Patent No.: US 10,781,907 B2
(45) Date of Patent: Sep. 22, 2020

(54) FILTERING PULLEY COMPRISING AN IMPROVED DAMPING DEVICE

(71) Applicant: DAYCO EUROPE S.R.L., Chieti (IT)

(72) Inventors: Gianluca Cariccia, Turin (IT); Andrea Guala, Biella (IT); Ettore Gaude, Chieti (IT); Gregorio Luciani, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 339 days.

(21) Appl. No.: 15/559,840

(22) PCT Filed: Mar. 18, 2016

(86) PCT No.: PCT/IB2016/051550
§ 371 (c)(1),
(2) Date: Sep. 20, 2017

(87) PCT Pub. No.: WO2016/151456
PCT Pub. Date: Sep. 29, 2016

(65) Prior Publication Data
US 2018/0045288 A1    Feb. 15, 2018

(30) Foreign Application Priority Data
Mar. 20, 2015   (IT) .................. 102015000009371

(51) Int. Cl.
*F16H 55/36*    (2006.01)
*F16F 15/123*   (2006.01)

(52) U.S. Cl.
CPC ........... *F16H 55/36* (2013.01); *F16F 15/123* (2013.01); *F16H 2055/366* (2013.01)

(58) Field of Classification Search
CPC ... F16H 55/36; F16H 2055/366; F16F 15/123
See application file for complete search history.

(56) References Cited

U.S. PATENT DOCUMENTS

| 2007/0060395 A1* | 3/2007 | Asbeck | F16D 3/52 |
| | | | 464/57 |
| 2008/0041687 A1* | 2/2008 | Cali | F16D 41/12 |
| | | | 192/46 |

(Continued)

FOREIGN PATENT DOCUMENTS

| DE | 10 2010 023714 A1 | 1/2011 |
| EP | 1 939 494 A2 | 7/2008 |

(Continued)

OTHER PUBLICATIONS

International Search Report and Written Opinion dated Jul. 25, 2016 in PCT/IB2016/051550 (10 pages).

*Primary Examiner* — Michael R Mansen
*Assistant Examiner* — Robert T Reese
(74) *Attorney, Agent, or Firm* — FisherBroyles, LLP; Susan M. Oiler

(57) ABSTRACT

A filtering pulley having a hub adapted to be fixed to a rotating shaft, a pulley ring mounted coaxial and rotationally free on said hub, and at least one elastic assembly interposed between the hub and the pulley ring and a damper for damping the relative oscillations between the hub and the pulley ring is disclosed. The damper has a first damping level for relative rotations between the hub and the pulley ring which are smaller than a predetermined angle and a second damping level, which is greater than the first level, for relative rotations between the hub and the pulley ring which are larger than the predetermined angle.

16 Claims, 7 Drawing Sheets

(56) References Cited

U.S. PATENT DOCUMENTS

| 2010/0029422 A1* | 2/2010 | Riu ........................... F16D 3/14 |
| | | 474/94 |
| 2016/0003342 A1* | 1/2016 | Manzoor ................. F16H 55/36 |
| | | 474/94 |
| 2016/0146328 A1* | 5/2016 | Dell ......................... F16H 55/36 |
| 2017/0254366 A1* | 9/2017 | Antchak ................. F02B 67/06 |

FOREIGN PATENT DOCUMENTS

| WO | 2007/000152 A1 | 1/2007 |
| WO | 2015/010190 A1 | 1/2015 |

\* cited by examiner

FILTERING PULLEY COMPRISING AN IMPROVED DAMPING DEVICE

CROSS-REFERENCE TO RELATED APPLICATIONS

The present invention is filed under 35 U.S.C. § 371 as the U.S. national phase of International Patent Application No. PCT/IB2016/051550, filed Mar. 18, 2016, which designated the United States and which claims the benefit of Italian Patent Application No. 102015000009371, filed Mar. 20, 2015, each of which is hereby incorporated in their entirety including all tables, figures, and claims.

TECHNICAL FIELD

The present invention concerns a filtering pulley, in particular a filtering pulley for an internal combustion engine comprising an improved damping device.

BACKGROUND ART

As is known, the drive shaft in internal combustion engines is subject to torsional vibrations due to the periodic stress caused by the combustion in the various cylinders. These vibrations are particularly intense at start-up and at low speeds, and in the presence of particular construction solutions such as dual-clutch transmissions or start-stop systems.

The torsional vibrations translate into irregular rotations of the ancillaries transmission drive pulley which are transmitted to the ancillaries by means of the drive belt, which is therefore subject to periodic tension variations.

In order to "filter" the torsional oscillations transmitted from the crank shaft to the belt, a filtering pulley is generally used as drive pulley, provided with a hub integral with the drive shaft, a pulley ring cooperating with the belt and one or more elastic elements via which the drive torque is transmitted from the hub to the pulley ring. The pulley is also expediently provided with a damping device having the purpose of damping the high amplitude oscillations in the transients, for example at start-up.

However, to effectively filter the oscillations when the engine is running up to speed, the damping must be as low as possible, conflicting with the above need.

DISCLOSURE OF INVENTION

The object of the present invention is to provide a filtering pulley comprising an improved damping device able to solve the above-mentioned problem.

The above-mentioned object is achieved by a filtering pulley according to claim 1.

BRIEF DESCRIPTION OF THE DRAWINGS

For a better understanding of the present invention, a preferred embodiment is described below, by way of non-limiting example and with reference to the accompanying drawings, in which.

BEST MODE FOR CARRYING OUT THE INVENTION

Figure 1:
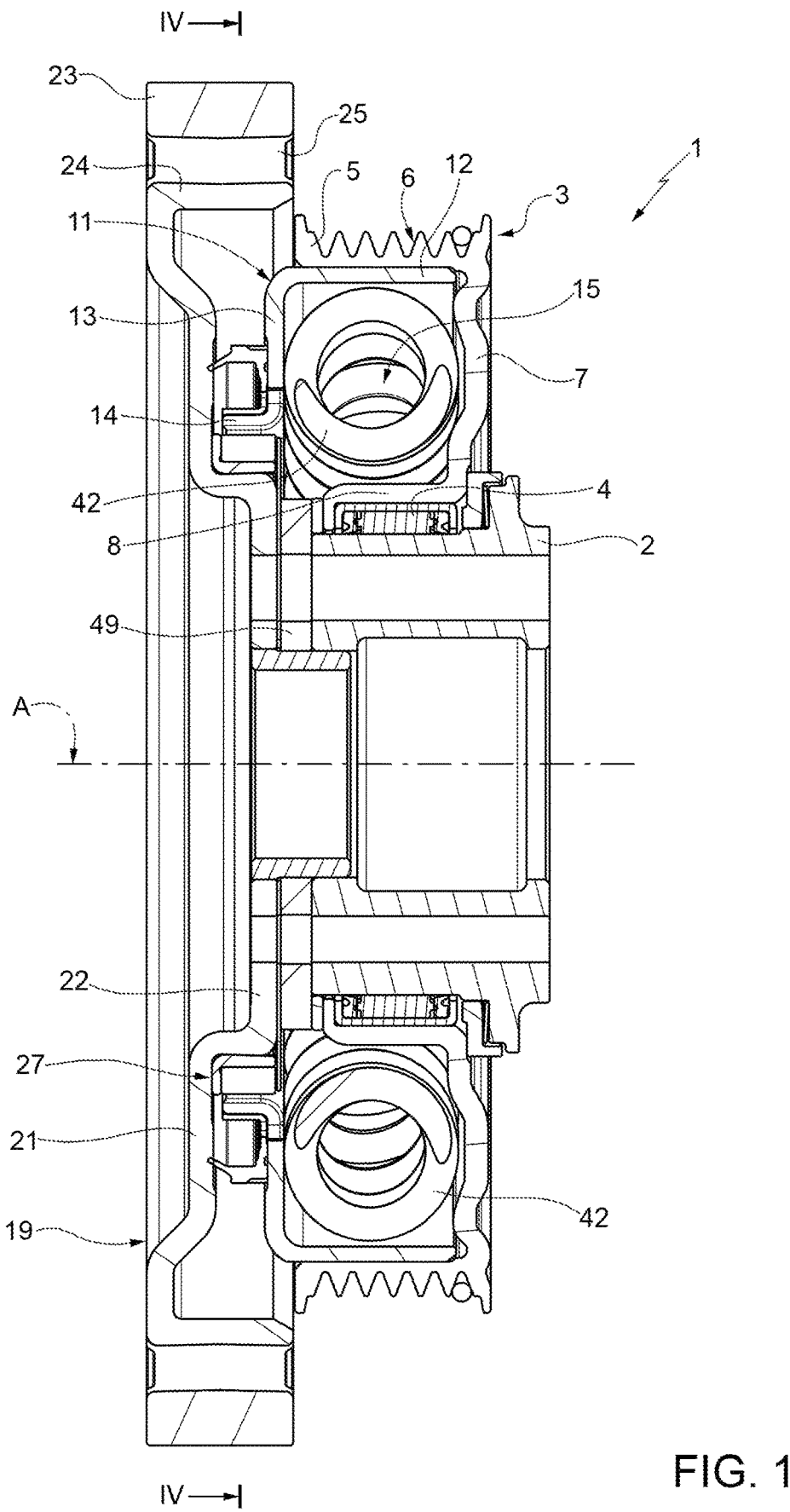
FIG. 1 is a diametral section of a filtering pulley according to the invention.
Figure 2:
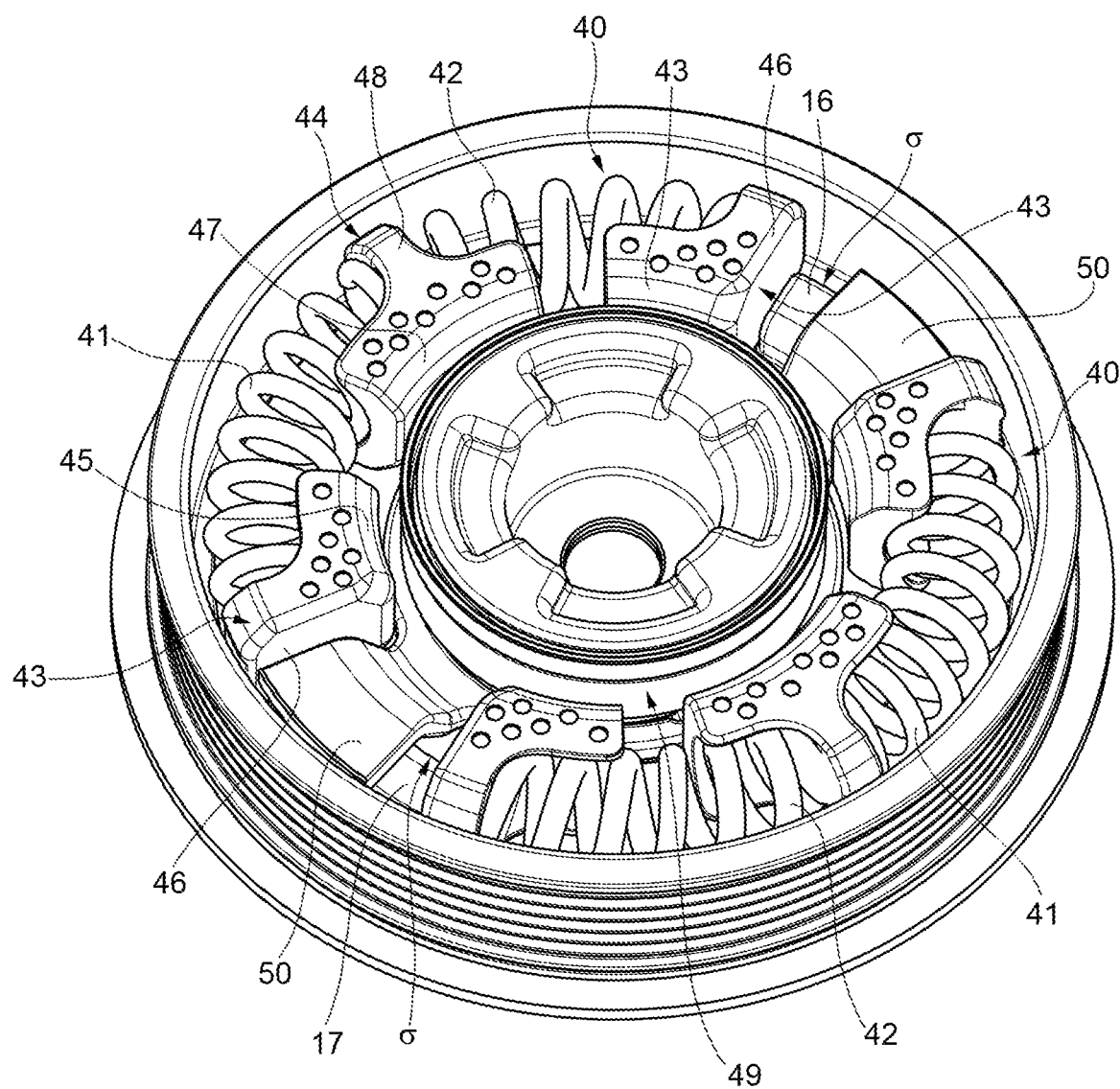
FIG. 2 is a perspective view of the pulley of FIG. 1 with parts removed for clarity.
Figure 3:
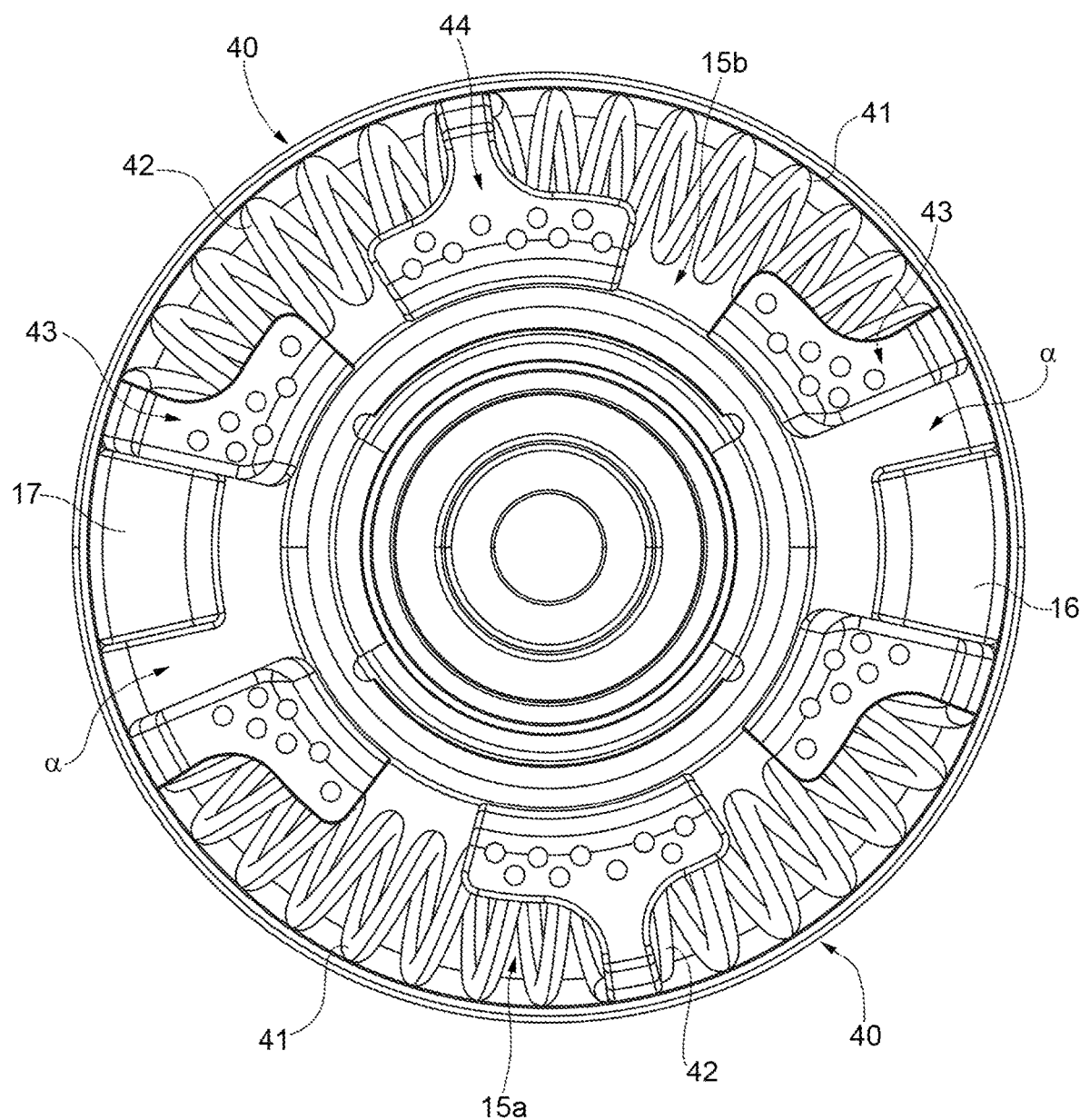
FIG. 3 is a front view of the pulley of FIG. 1 with parts removed for clarity.
Figure 4:
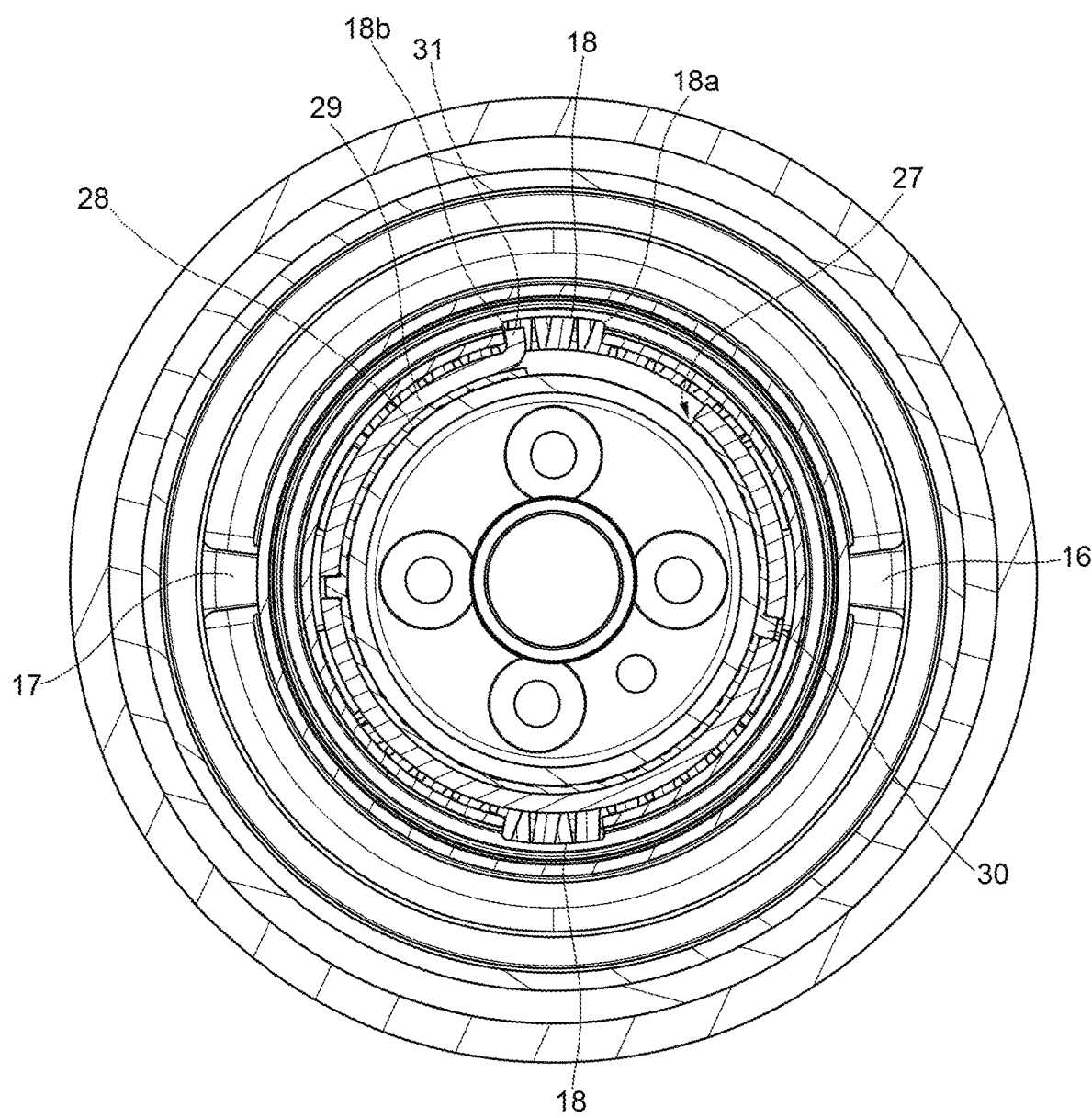
FIGS. 4 and 5 are sections along the line IV-IV of FIG. 1 in respective operating phases of the pulley of FIG. 1.

FIGS. 1 to 3 show a filtering pulley 1 comprising a hub 2 adapted to be connected to a shaft (not shown), for example a crank shaft of an internal combustion engine, and an annular pulley ring 3 externally coaxial to the hub 2 and supported in a rotationally free manner around an axis A by means of a bearing 4 interposed between the pulley ring 3 and the hub 2.

The pulley ring 3 comprises an annular portion 5 provided with a profile 6 designed to cooperate with a poly-V belt (not shown). The pulley ring 3 further comprises a radial wall 7, integral with the annular portion 5 and preferably in one single piece with it, extending radially towards the hub 2 and an inner substantially cylindrical wall 8 with axis A.

The pulley ring 3 carries, integral with it, a closing element 11 comprising an outer cylindrical wall 12 with axis A, a flat radial annular wall 13 and an inner cylindrical wall 14 with axis A, projecting cantilevered from the wall 13 on the opposite side of the cylindrical wall 12. The closing element 11 is press-fitted into the pulley ring 3 so as to form an annular chamber 15 radially comprised between the wall 12 and the wall 8 and axially delimited by the wall 7 and the wall 13. Lastly, the closing element 11 comprises two protrusions 16, 17 diametrically opposite extending axially into the chamber 15 from the wall 13 and two openings 18 obtained in the wall 14 and positioned at a halfway point of the angular distance between the protrusions 16, 17.

The wall 7 of the pulley ring 3 forms corresponding protrusions (not illustrated) facing the protrusions 16,17 of the closing element 11.

The pulley 1 is further provided with a dynamic damper 19 comprising a disc 21, facing the closing element 11 and having a hub portion 22 integral with the hub 2, and a seismic ring 23 secured to a perimeter flange 24 of the disc 21 by a ring 25 of elastomeric material.

Figure 7:
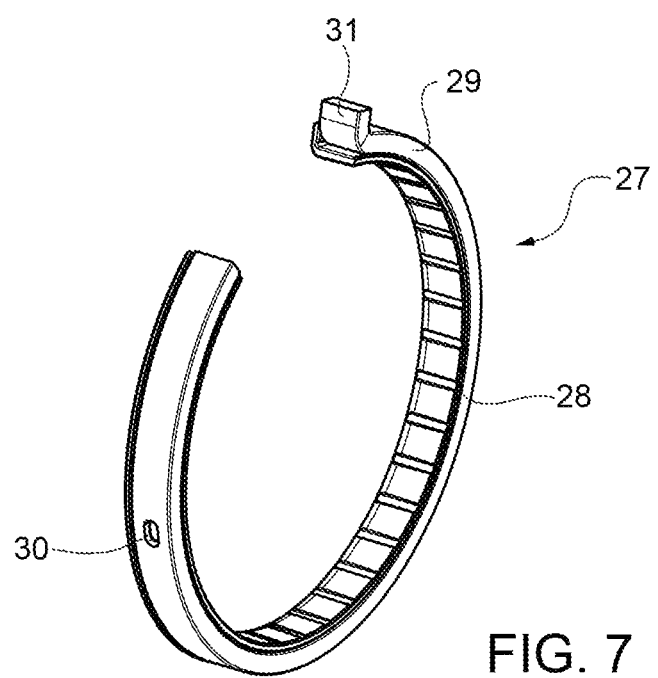
FIG. 7 is a perspective view of a damping device of the pulley subject of the invention.

The pulley 1 comprises a friction damper 27 radially interposed between the wall 14 of the element 11 and the hub portion 22 of the dynamic damper 19. The damper 27 substantially comprises a C-bushing 28 which slidingly cooperates with the hub portion 22 and an open metallic ring 29 mounted with radial driving on the bushing 28 and rotationally coupled to the same by means of a pair of radial protrusions 30 which engage corresponding holes in the ring 29 (FIG. 7).

The ring 29 comprises, at one of its ends, at least one outer radial protrusion 31 housed with freedom of movement in the circumferential direction inside the opening 18. Said movement expediently has a maximum angular amplitude of less than 10° in each direction, for example approximately ±7° starting from a position in which the protrusion 31 is positioned on the centre line of the opening 18.

The pulley 1 further comprises a plurality of, for example two, arched elastic assemblies 40 arranged circumferentially free in the respective portions 15a, 15b of the chamber 15 delimited by the protrusions 16 and 17. The travel of the elastic assemblies 40 in the respective portions 15a, 15b is given by an angular clearance α present between each of the elastic assemblies 40, arranged in contact with one of the protrusions 16, 17 and the other protrusion 17, 16.

Each of the elastic assemblies 40 comprises a pair of arched helical springs 41,42, positioned in series with each other and mounted between respective end sliding blocks 43 and an intermediate sliding block 44. The springs 41,42 have different rigidities, more precisely greater and lesser as will be described in further detail below. The sliding blocks 43 each comprise an arched portion 45 which internally surrounds an end portion of the respective spring 41,42, and a head 46 defining an axial support for said end portion. The sliding block 44 comprises an arched portion 47 which internally surrounds respective opposite end portions of the springs 41,42 and an intermediate radial partition 48 comprised between the two springs 41,42.

Lastly, the pulley 1 comprises an actuator 49 interposed axially between the hub 2 and the disc 21 of the dynamic damper 19 and integral with them. The actuator 49 has two spokes 50 free to move circumferentially in the chamber 15 and adapted to interact with the elastic assemblies 40. Assuming that the actuator 49 is arranged so that each of the spokes 50 is angularly equispaced with respect to the elastic assemblies 40, the angle comprised between each of the spokes 50 and each of the elastic assemblies 40 will be equal to σ/2, where σ represents the total angular clearance between the spokes 50 and the elastic assemblies 40.

The operation of the pulley 1 is described below with reference to the graph of FIG. 9, which shows the torque transmitted by the pulley 1 according to the relative angle of rotation between the pulley ring 3 and the hub 2, supposing for the sake of simplicity that the dampings are absent.

As can be seen from the graph, there is an angular interval β in which the hub 2 and the pulley ring 3 can rotate with respect to each other without any transmission of torque. This angular interval, or free angle, is equal to the sum of the angular clearances α and σ described above.

In a first operating phase, called driving mode and constituting the normal operating mode of the pulley 1 when the drive shaft drives the ancillaries, the speed of the hub 2 tends to exceed the speed of the pulley ring 3. Therefore the spokes 50 of the actuator 49, once the free angle β has been overcome, consisting, as described above, of the sum of the angular clearance σ between the spokes 50 and the elastic assemblies 40 and of the angular movement a of the latter, transmit the torque to the protrusions 16, 17 with interposition of the respective elastic assemblies 40.

As the torque transmitted increases, the elastic deformation of the springs 41, 42 positioned in series with each other increases; the relation between torque and relative angle of rotation is therefore linear, with a first gradient K1 defined by the equivalent rigidity of the two springs 41,42 in series.

Figure 9:
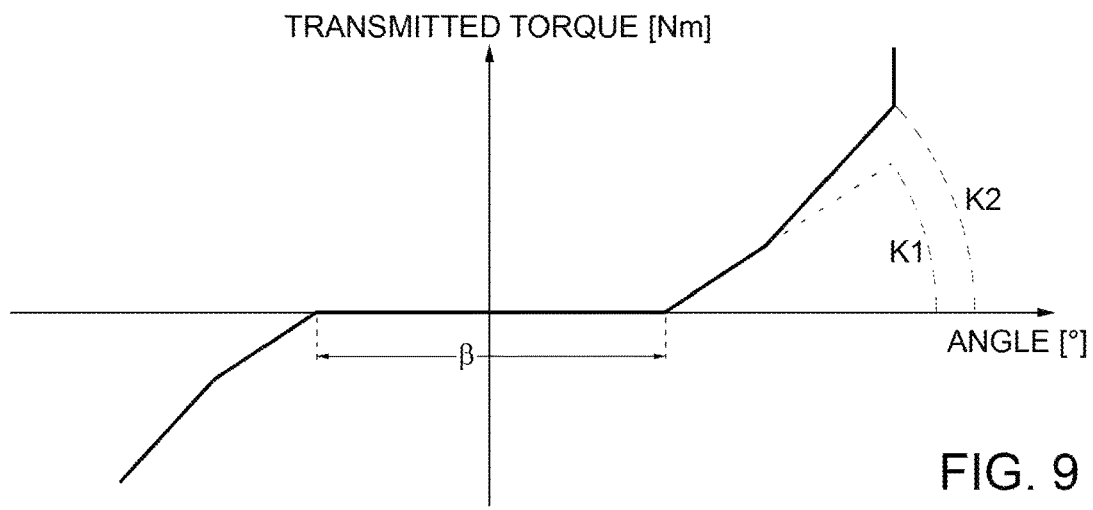
FIGS. 9 and 10 are graphs showing the torque transmitted by the pulley of FIG. 1 according to its rotation angle, without and with damping respectively.

When the spring 41 is fully compressed, the rigidity of the elastic assembly 40 is equal to that of the spring 42 and therefore greater, as can be seen from the section with higher gradient K2 of the graph of FIG. 9. When the spring 42 is also fully compressed, the elastic assembly 40 behaves like a rigid body, as can be seen from the vertical section of the graph of FIG. 9.

In a second operating phase, called overrunning, the speed of the pulley ring 3 tends to exceed the speed of the hub 2. What has been described for the driving mode occurs symmetrically also in the overrunning condition.

Figure 8:
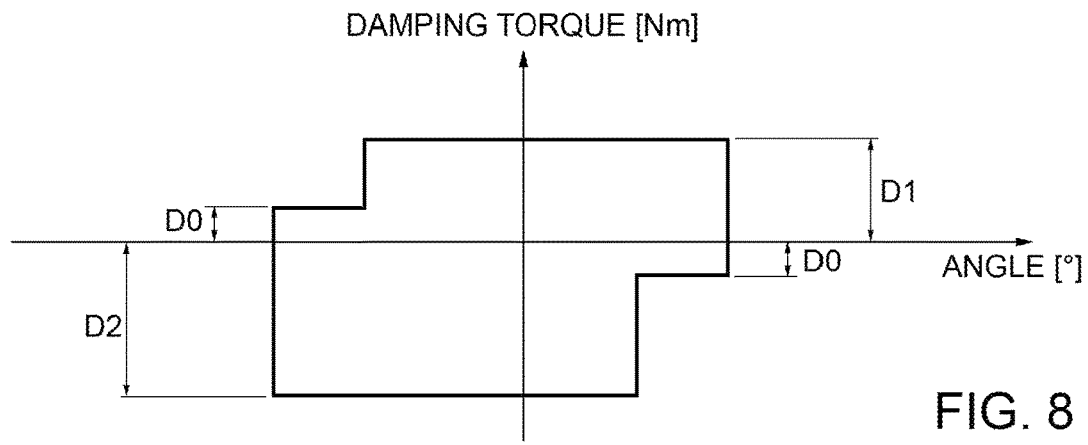
FIG. 8 is a graph showing the damping torque provided by the damping device according to the rotation angle of the pulley of FIG. 1.

The damper 27 acts between the hub 2 and the pulley ring 3, in parallel to the elastic assemblies 40; the effects are illustrated in the graph of FIG. 8. The damper 27 has an asymmetric behaviour between the driving mode and the overrunning mode.

Figure 5:
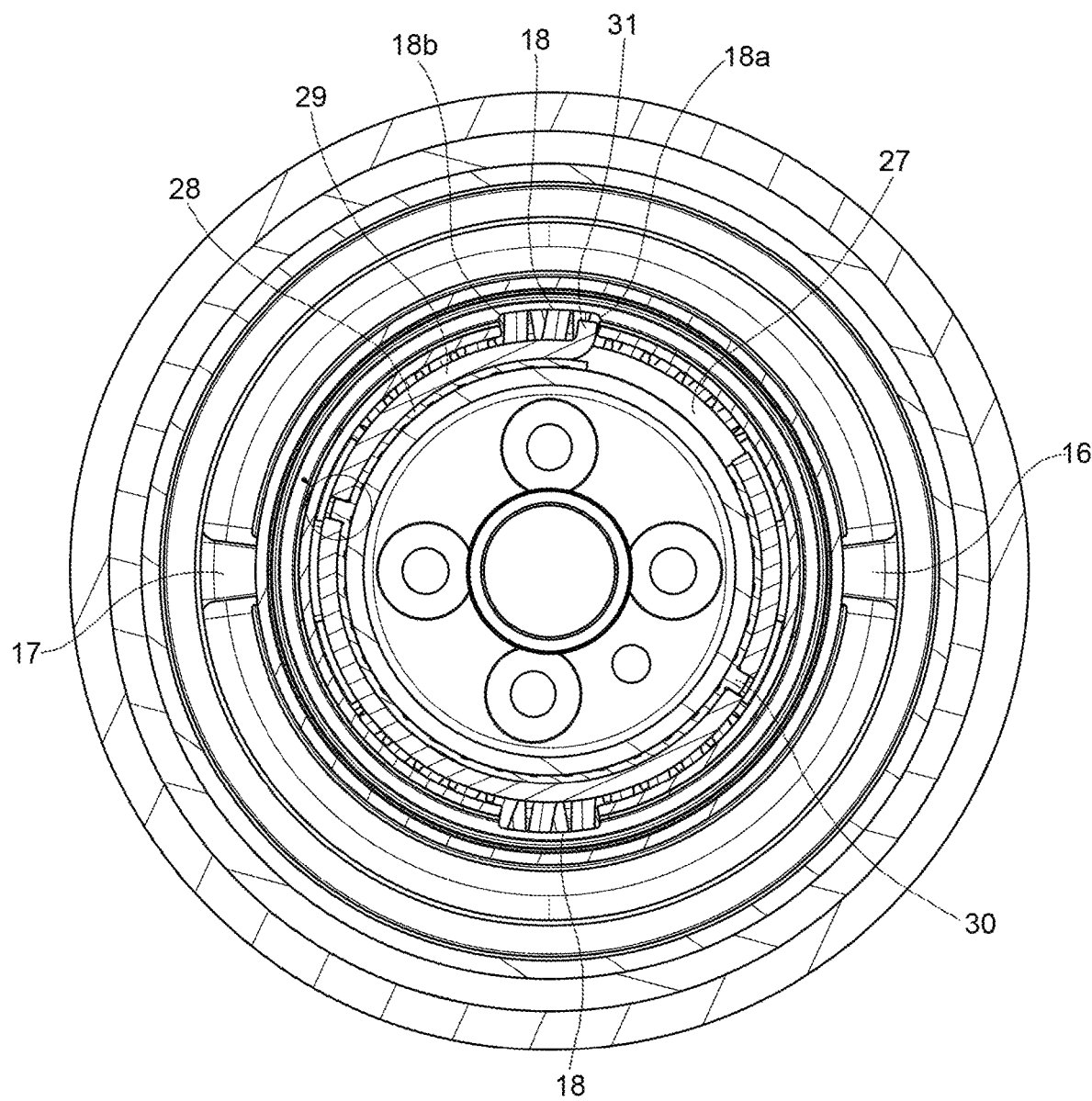

In particular, in the driving mode (FIG. 5), the ring 29 is arranged with the protrusion 31 in contact with the end 18a of the opening 18 facing in the direction of the rotation. The ring 29 is therefore integral with the pulley ring 3 and a sliding occurs between the bushing 28 and the hub portion of the disc 18.

The contact force between the protrusion 31 and the end 18a of the opening 18 determines a torque which tends to "open" the ring 29. This determines a relatively reduced damping value D1 but greater than a value D0 equal to the damping that would be present in the absence of the damper 27, generated for example by the friction associated with the elastic assemblies 40. During this phase, the amplitude oscillations, which are less than the angular amplitude of the opening 18, cause detachment of the protrusion 31 from the end 18a and are optimally filtered thanks to the low damping value D0.

When the torque between the driving mode and the overrunning mode is inverted, the ring 29 rotates with respect to the pulley ring 3 so that the protrusion 31 reaches the opposite end 18b of the opening 18. During this rotation the damping value is equal to D0.

In the overrunning mode the protrusion 31, cooperating with the end 18b, produces a torque which tends to close the ring 29 on the hub portion 22, thus causing a damping D2 with value greater than D1. Also in this case any amplitude oscillations less than the angular amplitude of the opening 18 cause detachment of the protrusion 31 from the end 18b and are optimally filtered thanks to the low damping value D0.

Figure 10:
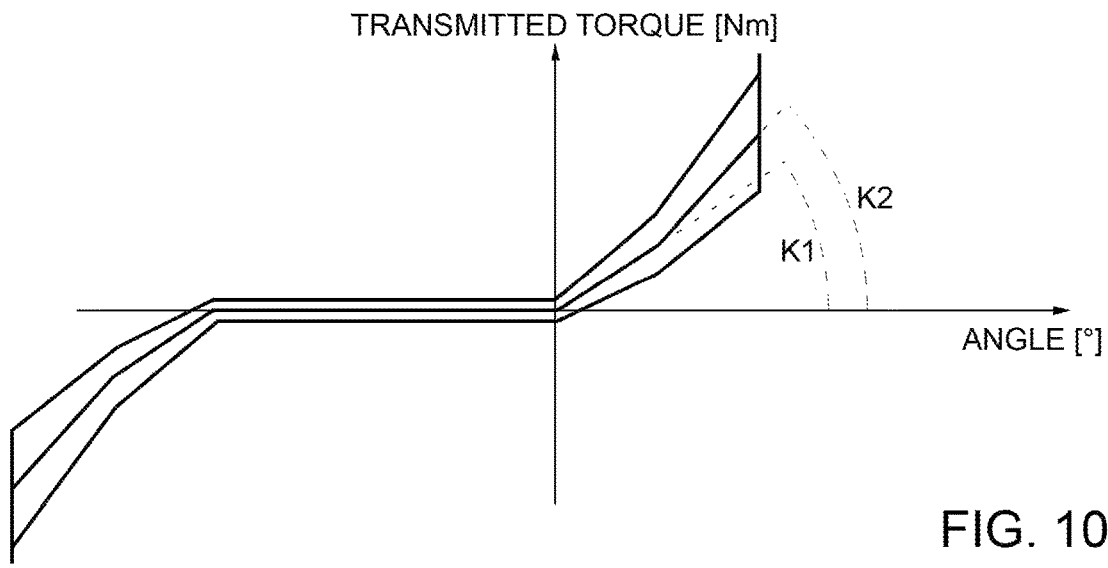

FIG. 10 is analogous to FIG. 9 but takes account of the dampings; the curve therefore shows a hysteresis generated by the damping described above.

Figure 6:
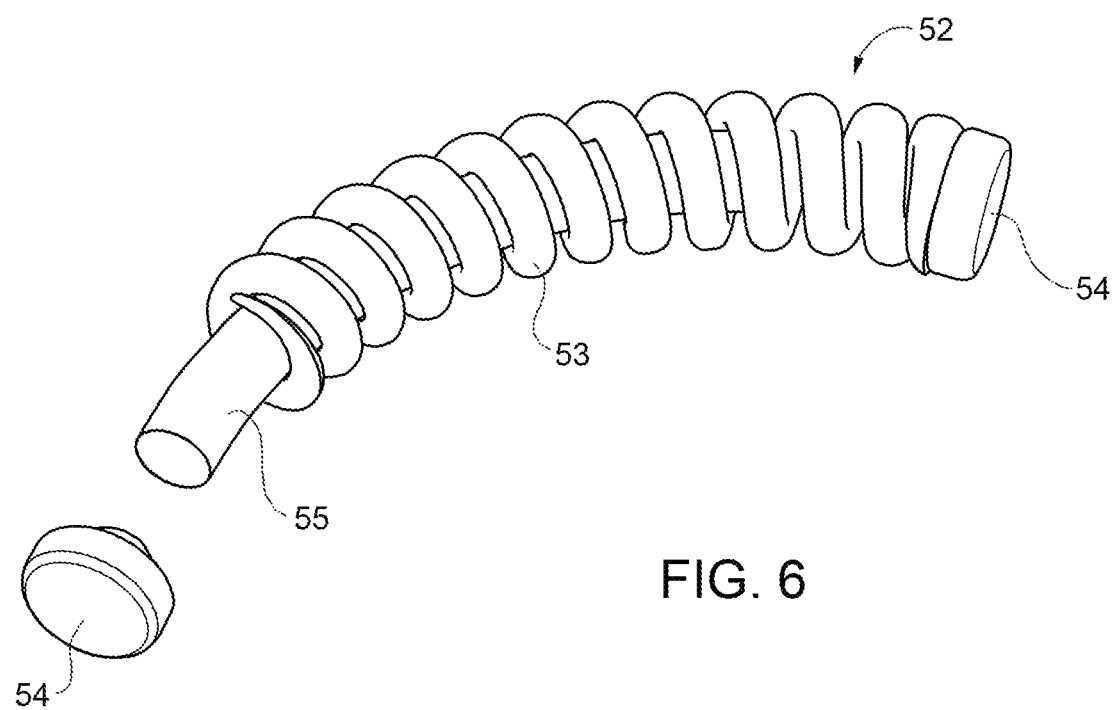
FIG. 6 is an exploded perspective view of an elastic assembly according to a variation of the pulley of FIG. 1.

FIG. 6 illustrates an embodiment variation of an elastic assembly 40, indicated as a whole by the number 52. The elastic assembly 52 comprises one single spring 53 provided with a pair of end pads 54 which are adapted to cooperate with the spokes 50. The elastic assembly 52 further comprises an anti-warping element 55 for the spring 53, consisting essentially of an arched cylinder made of polymer material, coaxial to the spring 53 and housed with slight interference inside the spring.

The behaviour of the pulley 1 is analogous with the difference that the relative torque-rotation graph of FIG. 9 has one gradient only. During the full compression of the spring 53 the anti-warping element 55 does not allow overlapping of the coils of the spring 53.

The advantages of a pulley 1 according to the invention are therefore evident. The use of elastic assemblies 40 with angular clearance α with respect to the protrusions 16,17 and an actuator 49 with an angular clearance σ with respect to the elastic assemblies 40 allows a very high free angle β to be obtained which permits decoupling of the hub 2 and pulley ring 3 in the presence of high amplitude torsional oscillations, such as those that occur at start-up, for example, thus avoiding subjecting the belt and ancillaries to undesired impact loads.

Thanks to the presence of the free angle β, the springs 42 can be designed with a relatively high rigidity, optimal for transmission of the torque, even though the overall system comprising the elastic assemblies 40 and the angular clearances α and σ has a low equivalent rigidity.

The damper 27 is activated only for relative rotations greater than the amplitude of the opening 18 and therefore, for oscillations with lower amplitude, the filtering capacity of the pulley 1 is not affected. In the presence of large amplitude relative rotations, the damper 27 behaves asymmetrically, with greater damping in the overrunning phase.

Lastly it is clear that modifications or variations can be made to the pulley 1 described that do not depart from the protective scope defined by the claims.

For example the characteristic of the damper 27 could be symmetrical, i.e. the damper 27 could have a protrusion 31 at each of its ends. The damper 27 could be integral with the pulley ring 3 and interact with the hub 2. The protrusions 31 could be axial and non-radial and therefore interact with appropriate surfaces extending from the hub 2 or from the pulley ring 3 and not with an opening 18 as illustrated.

The invention claimed is:

1. A filtering pulley comprising:
a hub defining a bore for receiving a shaft,
a pulley ring mounted coaxial and rotationally free on said hub,
at least one elastic assemblies interposed between said hub and said pulley ring, and
a damper for damping the relative oscillations between said hub and said pulley ring,
wherein said damper has a first damping level for relative rotations between said hub and said pulley ring, which are smaller than a predetermined angle, and a second damping level, which is greater than the first damping level, for relative rotations between said hub and said pulley ring which are larger than said predetermined angle and said damping is asymmetrical according to the relative direction of rotation between said hub and said pulley ring.

2. A pulley according to claim 1, wherein said damper comprises a C-bushing which slidingly cooperates with a cylindrical surface which is integral with one of said hub and said pulley ring, and comprises an open metallic ring mounted, with radial driving, onto said C-bushing; wherein the open metallic ring is coupled rotationally, to the C-busing and has an end protrusion seated within an opening in either said hub or said pulley ring with freedom of movement in the circumferential direction inside said opening.

3. A pulley according to claim 2, characterized in that said protrusion is movable in said opening with an amplitude of movement of less than 10° in each direction.

4. A pulley according to claim 3, characterized in that said amplitude of movement is about 7° in each direction.

5. A pulley according to claim 1, characterized in that said pulley comprises a plurality of elastic assemblies arranged circumferentially with respect to said hub and said pulley ring and interposed, each, between a pair of first elements which are integral with the hub, and between a pair of second elements which are integral to said pulley ring, each elastic assembly forming, with said first elements and with said second elements, respective angular clearances (σ, α), said pulley ring and said hub having a relative free angle (β) of rotation equal to the sum of said angular clearances (σ, α).

6. A pulley according to claim 5, characterized in that said pair of first elements comprises at least two spokes carried by an actuator which is integral with the hub.

7. A pulley according to claim 5, characterized in that said second elements are protrusions obtained on an element which is integral with the pulley ring.

8. A pulley according to claim 5, characterized in that said elastic assembly comprises at least one arched spring sliding circumferentially inside a seat formed by said first elements and/or said second elements.

9. A pulley according to claim 8, characterized in that said elastic assembly comprises at least two sliding blocks applied to respective ends of said spring and sliding in said seat.

10. A pulley according to claim 9, characterized in that said sliding blocks comprise, each, an arched portion surrounding a side portion of said spring and a head perpendicular to said arched portion.

11. A pulley according to claim 5, characterized in that said elastic assembly comprises at least two springs in series with one another.

12. A pulley according to claim 11, characterized in that the two springs have different rigidities.

13. A pulley according to claim 5, characterized in that said elastic assembly comprises an anti-warping device for said spring.

14. A pulley according to claim 13, characterized in that said anti-warping device comprises a polymeric material element accommodated coaxial inside said spring.

15. A pulley according to claim 1, characterized in that it comprises a dynamic damper.

16. A pulley according to claim 15, characterized in that the dynamic damper comprises a disc which is integral with the hub and in that said cylindrical surface belongs to said disc.

* * * * *